(12) United States Patent
Luecke et al.

(10) Patent No.: US 11,642,771 B2
(45) Date of Patent: May 9, 2023

(54) OPERATING DEVICE WITH HANDLE AND MOTORIZED WORKING APPARATUS

(71) Applicant: Andreas Stihl AG & Co. KG, Waiblingen (DE)

(72) Inventors: Johannes Luecke, Waiblingen (DE); Dirk Foerstner, Stuttgart (DE); Denis Ehrler, Wernau (DE); Michael Varga, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 82 days.

(21) Appl. No.: 16/916,806

(22) Filed: Jun. 30, 2020

(65) Prior Publication Data

US 2021/0001467 A1    Jan. 7, 2021

(30) Foreign Application Priority Data

Jul. 1, 2019    (EP) ...................... 19183569

(51) Int. Cl.
*B25F 5/02*    (2006.01)
*A01G 3/08*    (2006.01)

(52) U.S. Cl.
CPC ................ *B25F 5/02* (2013.01); *A01G 3/085* (2013.01)

(58) Field of Classification Search
CPC .................................. A01G 3/085; B25F 5/02
See application file for complete search history.

(56) References Cited

U.S. PATENT DOCUMENTS 6,021,630 A * 2/2000 Higashi .................. A01D 34/90
30/276
6,823,591 B2 * 11/2004 Kobayashi ............. A01D 34/90
30/276
9,049,816 B2    6/2015 Ito et al.
10,028,432 B2    7/2018 Ifuku et al.
2009/0229131 A1 * 9/2009 Tomiyama ............. A01D 34/90
30/276

FOREIGN PATENT DOCUMENTS

| DE | 10 2014 006 910 A1 | 12/2014 |
| EP | 2 474 218 A1 | 7/2012 |
| EP | 2 845 460 A1 | 3/2015 |
| KR | 10-2015-0049507 A | 5/2015 |
| WO | WO 2013/081509 A1 | 6/2013 |

* cited by examiner

*Primary Examiner* — Daniel Jeremy Leeds
(74) *Attorney, Agent, or Firm* — Crowell & Moring LLP (57) ABSTRACT

A hand-guided motorized working apparatus and an operating device for the apparatus are provided. The operating device has a handle shank configured to be hand-gripped, an operating element receiving region adjoining the handle shank, and an operating unit which acts on the apparatus operation and includes an operating element which is held movably on the operating element receiving region for actuation by a finger of a hand gripping the handle shank, and has a finger rest region extending along an outer side of the operating element receiving region. In the operating device, the operating element is a pivot operating lever which is held on the operating element receiving region so as to be pivotable about a pivot axis, wherein the pivot axis extends with a main direction component perpendicular to a shank longitudinal axis of the handle shank, and wherein the finger rest region, in a longitudinal extension along the outer side of the operating element receiving region, has a bent and/or angled course with a circumferential direction component and an axial direction component.

14 Claims, 6 Drawing Sheets

Fig. 12

OPERATING DEVICE WITH HANDLE AND MOTORIZED WORKING APPARATUS

CROSS REFERENCE TO RELATED APPLICATION

This application claims priority under 35 U.S.C. § 119 from European Patent Application No. 19183569.3, filed Jul. 1, 2019, the entire disclosure of which is herein expressly incorporated by reference.

BACKGROUND AND SUMMARY OF THE INVENTION

The invention relates to a hand-guided motorized working apparatus and an operating device for this, wherein the operating device comprises a handle with a handle shank configured to be hand-gripped, an operating element receiving region adjoining the handle shank, and an operating unit which acts on the apparatus operation and comprises an operating element which is held movably on the operating element receiving region for actuation by a finger of a hand gripping the handle shank, and comprises a finger rest region extending along an outer side of the operating element receiving region.

Hand-guided motorized working apparatuses in the present case are apparatuses which serve a working purpose, e.g. for gardening and/or forestry, are hand-carried or ground-supported, wherein in the latter case they are guided by hand, and have an internal combustion engine or an electric motor as a drive e.g. of a corresponding working tool. Gardening/forestry apparatuses of this type are used for example as motorized saws, hedge trimmers, pruners, strimmers, hedge shears, leaf blowers, sweepers, lawnmowers and scarifiers, either as petrol-engined or as battery-powered electric working apparatuses, to name just a few exemplary applications.

A user may grip the working apparatus with his hand on the handle. For this, the handle includes a handle shank configured to be hand-gripped, meaning a shaft-like or tubular handle part of the working apparatus which the user can surround with a hand. "Surround" here means that the user's hand surrounds or grips the handle shank over at least half of its circumference and preferably over significantly more than half the circumference, up to complete enclosure of the handle shank over its entire circumference. Also, the operating device contains the operating unit acting on the apparatus operation, by means of which the user can operate or otherwise influence the operation of the working apparatus and in particular the operation of the drive motor serving for this purpose. This operating device in particular includes the operating element which can be actuated by a finger of the hand gripping the handle shank. Optionally, the operating unit comprises one or more further operating elements.

The operating element is held movably on the operating element receiving region which adjoins the handle shank preferably in the distal direction, i.e. in a direction pointing forward along a longitudinal axis of the working apparatus, alternatively in the proximal or lateral direction. Accordingly, comfortable one-hand operation of the operating element is possible with the same hand with which the user grips or surrounds the handle shank. For this, the operating element has a finger rest region extending along the outer side of the operating element receiving region. To operate the operating element with the finger concerned, the user can press against the finger rest region and in this way achieve the operating movement of the operating element. If the operating element receiving region adjoins the handle shank distally, the user can actuate the operating element particularly easily with a distal finger of the hand gripping the handle shank. The distal finger is a finger on the hand which points forward in the apparatus longitudinal direction when the hand surrounds the handle shank. In typical cases, this is in particular the thumb and/or the index finger of the hand concerned.

The battery-powered hedge trimmer marketed by the applicant under model designation HLA56 is one example of such a working apparatus. The operating device of this hedge trimmer has, as an operating element, a switch lever extending on the underside of the handle shank for switching the electric motor on and off, a release slider for releasing the switch lever, and a so-called ergo lever which holds the release slider in position when the switch lever is released. The release slider is held at the operating element receiving region distally adjoining the handle shank, so as to be translationally movable i.e. displaceable in the axial direction, i.e. in a direction parallel to a longitudinal axis of the handle shank, and is configured to be actuated by a distal finger, in particular the thumb, of the hand gripping the handle shank; wherein a web-type finger rest region of said release slider extends in a U-shape along the outer side of the operating element receiving region, in a transverse plane perpendicular to the longitudinal axis of the handle shank, and in particular over the top side region of the operating element receiving region and along adjacent side regions on both sides; wherein at the side, the finger rest region terminates above a longitudinal center plane of the handle shank and of the operating element receiving region, which divides the handle shank into a top side with the ergo lever and an underside with the switch lever.

A similar operating device for hedge shears is disclosed in laid-open publication KR 2015-0049507 A, wherein the release slider here is an operating slider held at the top of the operating element receiving region distally adjoining the handle shank, so as to be axially movable in translation.

Patent publication DE 10 2014 006 910 B4 discloses a vegetation cutter as a further working apparatus of the type concerned here, with a correspondingly associated operating device which comprises a power switch trigger arranged on the underside of the handle shank for actuating the drive motor there for driving a rotary cutter, and a safety blocking mechanism for optionally blocking or releasing the power switch trigger; wherein the safety blocking mechanism has an operating knob which is held on the respective operating element receiving region distally adjoining the handle shank, so as to be rotatable about a rotational axis parallel to the shank longitudinal axis.

It is an object of the present invention to provide an operating device of the type mentioned in the outset, which offers advantages with respect to the above-mentioned prior art with regard to comfortable, flexible and ergonomic actuation of the operating element by the user. Further, it is an object of the present invention to provide a hand-guided motorized working apparatus equipped with such an operating device.

The invention achieves these and other objects by providing an operating device comprising a handle with a handle shank configured to be hand-gripped, an operating element receiving region adjoining the handle shank, and an operating unit which acts on the apparatus operation and comprises an operating element which is held movably on the operating element receiving region for actuation by a finger of a hand gripping the handle shank, and comprises a finger rest region extending along an outer side of the operating element receiving region. The operating element is a pivot operating lever which is held on the operating element receiving region so as to be pivotable about a pivot axis. The pivot axis extends with a main direction component perpendicular to a shank longitudinal axis of the handle shank. The finger rest region, in a longitudinal extension along the outer side of the operating element receiving region, has at least one of a bent and an angled course with a circumferential direction component and an axial direction component.

In addition, the invention achieves these and other objects by providing a hand-guided motorized working apparatus comprising such operating device according to the invention. Advantageous refinements of the invention are mentioned in the subclaims.

In the operating device according to the invention, the operating element which can be actuated by a finger is a pivot operating lever which is held on the operating element receiving region so as to be pivotable about a pivot axis, wherein the pivot axis extends with a main direction component perpendicular to a shank longitudinal axis of the handle shank, and wherein the finger rest region, in a longitudinal extension along the outer side of the operating element receiving region, has a bent and/or angled course with a circumferential direction component and an axial direction component.

The pivot axis of the operating element accordingly extends perpendicularly to the shank longitudinal axis of the handle shank, or is tilted relative thereto at an angle of between 45° and 90°. The finger rest region of the operating element runs in a longitudinal extension along the outer side of the operating element receiving region over its entire length, or in any case in one or more part portions, with a bent or angled course having both a direction component in the circumferential direction of the operating element receiving region and hence also of the handle shank, and also a direction component in the axial direction perpendicular to this circumferential direction. Such a bent and/or angled course means that the finger rest region is optimally suited for the user to be able to press, with the respective operating finger, at a point best suited to the momentary finger or hand position on the handle shank, comfortably against a portion of the finger rest region facing said finger there, in order to cause the pivot movement of the operating element. Preferably, for this the finger rest region with its bent and/or angled course provides rest contact portions at various points along its longitudinal extension; wherein two or more such portions have mutually differing surface normal directions along which the pressure force generating the torque for the pivot movement acts when the user presses with the respective finger against this portion.

These characteristics of the operating element offer a high operating comfort for the user, who can thereby actuate the operating element comfortably by pivoting about a pivot axis which is perpendicular to the longitudinal axis of the handle shank or in any case runs at a significantly oblique angle thereto, e.g. optionally with the thumb or index finger of his hand gripping the handle shank, in different positions of the finger and/or at different positions of the finger rest region which runs with a bent and/or angled course at least in portions firstly in a circumferential direction and secondly in the axial direction. The resulting operating comfort may in particular be greater than with conventional designs, in which the operating element must be displaced axially or pivoted about a pivot axis parallel to the longitudinal axis of the handle shank.

In a refinement of the invention, the handle shank comprises an upper palm rest region above a first longitudinal center plane and a lower finger gripping region below the first longitudinal center plane, and the finger rest region extends, at least on one of two mutually opposite sides of the operating element receiving region relative to a second longitudinal center plane of the handle shank perpendicular to the first longitudinal center plane, with a bent and/or angled course in circumferential direction and axial direction. In this way, the operating element can very easily be actuated from the side of the operating element receiving region, i.e. at a transverse side region between a handle top side, against which at least partially the palm of the hand gripping the handle shank comes to rest, and a handle underside, against which at least partially the fingers of the hand gripping the handle shank come to rest. Alternatively, the finger rest region may extend e.g. also along only a top side or underside of the operating element receiving region with a bent and/or angled course in circumferential direction and axial direction.

In one embodiment of the invention, the finger rest region, on the at least one of the two mutually opposite sides of the operating element receiving region relative to the second longitudinal center plane of the handle shank, in a lower end region, has a portion extending upward towards the rear. This allows operating actuation of the operating element with a pressure force directed upward towards the front, such as may easily be exerted in particular with the thumb of the hand gripping the handle shank.

In a refinement of the invention, the handle shank comprises an upper palm rest region above a longitudinal center plane and a lower finger gripping region below the longitudinal center plane, and the pivot axis lies below the longitudinal center plane. This optimises the position of the pivot axis and hence the pivot movement of the operating element relative to the position of the handle shank and hence relative to the position of the user's hand gripping this.

In one embodiment of the invention, the finger rest region extends arch-shaped continuously between a first end region on a first of the two mutually opposite sides of the operating element receiving region relative to the second longitudinal center plane of the handle shank, below the first longitudinal center plane of the handle shank, and a second end region on the second of the two mutually opposite sides of the operating element receiving region relative to the second longitudinal center plane of the handle shank, over a top region of the operating element receiving region lying above the first longitudinal center plane of the handle shank. Thus the user may comfortably actuate the operating element variably over a broad region of the circumferential extension of the operating element receiving region, at the most suitable point, using the best-positioned finger in each case.

In a refinement of the invention, the operating unit, as further operating elements, comprises a power control operating element extending in a bottom region of the handle shank, and a safety operating element extending in a top region of the handle shank, both being held movably on the operating element receiving region, and the pivot operating lever is configured as a blocking lever which in a blocking position blocks a movement of the power control operating element and/or the safety operating element, and in a release position allows the movement of the power control operating element and/or the safety operating element. Thus the operating unit provides an advantageous operating configuration which may be used beneficially in particular for a wide range of electrically powered gardening and forestry apparatuses.

The hand-guided motorized working apparatus according to the invention may in particular be a hand-guided motorized gardening/forestry apparatus and comprises am operating device according to the invention.

Advantageous embodiments of the invention are shown in the drawings. These and further advantageous embodiments of the invention are explained in more detail below with reference to the drawings. In the drawings:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
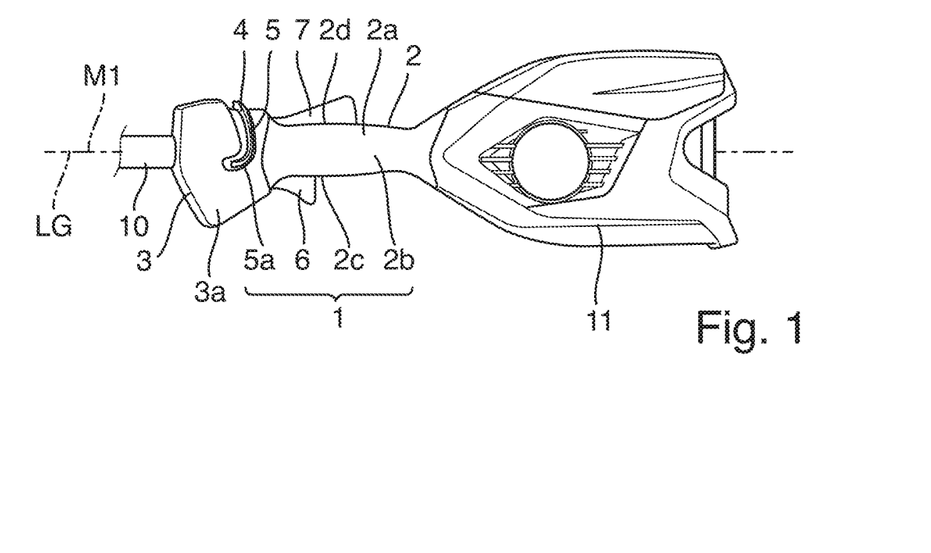
FIG. 1 shows a side view of a rear part of a hand-guided motorized working apparatus with an operating device with pivoting operating lever which can be actuated by a finger.

The hand-guided motorized working apparatus shown here in FIG. 1 with its essential parts may for example be a hand-guided motorized gardening/forestry apparatus which has a battery-powered electric motor or alternatively an internal combustion engine as its drive motor. The working apparatus contains an operating device 1 according to the invention, the essential constituents of which are also shown in the further FIGS. 2 to 12 and which in addition may, depending on the application, comprise further conventional components. The working apparatus may for example be a hedge trimmer, a brush cutter, a pruner or a strimmer. In these applications, the working apparatus is designed as a so-called shank apparatus which, in a conventional fashion (of no further interest here and therefore not shown), carries a corresponding working tool at the front end of a tubular shaft 10 (shown merely indicatively in FIG. 1 with its rear part), while the operating device 1 is situated in the rear end region of the tubular shaft 10. In the embodiment shown, at its rear end the apparatus has a housing body 11 which, depending on apparatus design, may serve to accommodate a drive motor and/or a battery pack.

The operating device 1 comprises a handle with a handle shank 2 configured to be hand-gripped, an operating element receiving region 3 adjoining the handle shank 2, and an operating unit serving to operate the apparatus and in particular operate its drive motor. The operating unit comprises an operating element in the form of a pivot operating lever 4 which, for operation by a finger of a hand gripping the handle shank 2, is held on the operating element receiving region 3 so as to be pivotable about a pivot axis $S_A$ and has a finger rest region 5 extending along an outer side 3a of the operating element receiving region 3.

Figure 2:
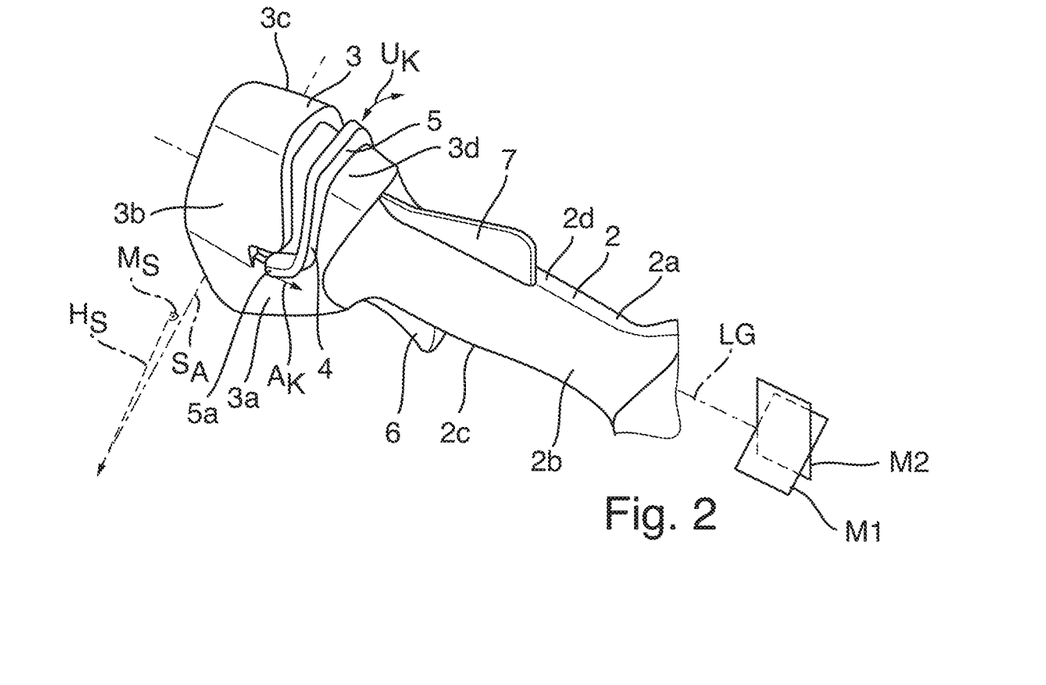
FIG. 2 a perspective view from the top rear of a part, which is of interest here, of the operating device of the apparatus from FIG. 1.

The pivot axis $S_A$ of the pivot operating lever 4, as illustrated in FIG. 2, extends with a main direction component $H_S$ perpendicular to a shank longitudinal axis $L_G$ of the handle shank 2. The shank longitudinal axis $L_G$ of the handle shank 2 may at the same time also be a longitudinal axis of the operating element receiving region 3 and/or the tubular shaft 10.

This means that the pivot axis $S_A$ extends perpendicularly to the shank longitudinal axis $L_G$ or in any case at an angle of more than 45° obliquely to the shank longitudinal axis $L_G$, so that a component $M_S$ of the direction of the pivot axis $S_A$ perpendicular to the main direction component $H_S$ is an amount smaller than the main direction component $H_S$. When the pivot axis $S_A$ is oriented perpendicularly to the shank longitudinal axis $L_G$, the direction component $M_S$ perpendicular to the main direction component $H_S$ is equal to zero.

Figure 4:
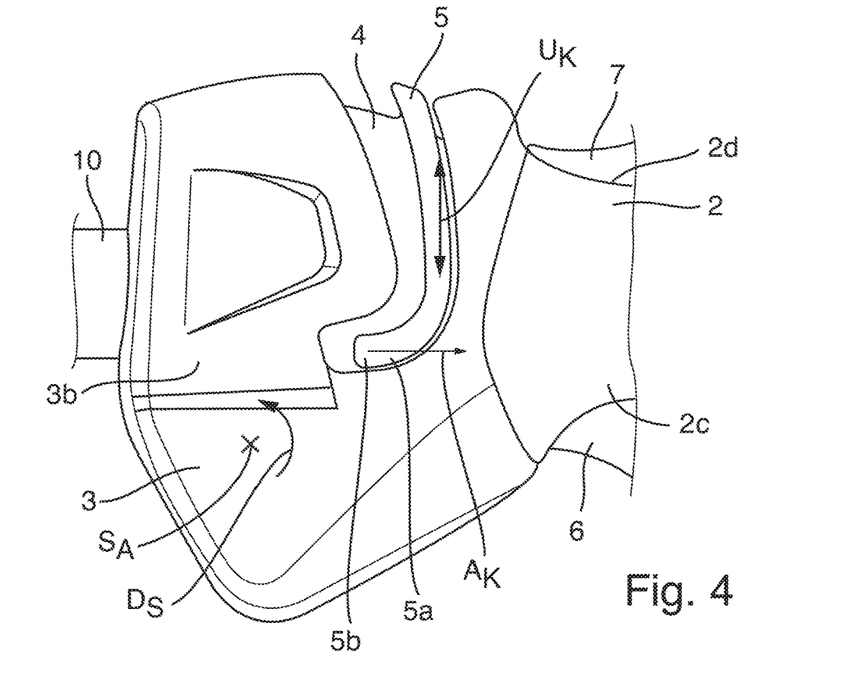
FIG. 4 a detail view of an operating element receiving region from FIG. 1.

In a longitudinal extension along the outer side 3a of the operating element receiving region 3, the finger rest region 5 has a bent and/or angled course with a circumferential direction component $U_K$ and an axial direction component $A_K$, as illustrated explicitly as an example in FIGS. 2 and 4. The circumferential direction component $U_K$ is here the direction component of the longitudinal course of the finger rest region 5 which is oriented perpendicularly to the shank longitudinal axis $L_G$, and accordingly the axial direction component $A_K$ is the direction component of the longitudinal course of the finger rest region 5 which runs parallel to the shank longitudinal axis $L_G$.

The finger rest region 5, as for example in the case shown, may have a bent and/or angled web-type shape, i.e. a finger rest web with a specific web width and a web length which is significantly longer than this, wherein in this case the web length constitutes the longitudinal extension of the finger rest region 5.

Figure 3:
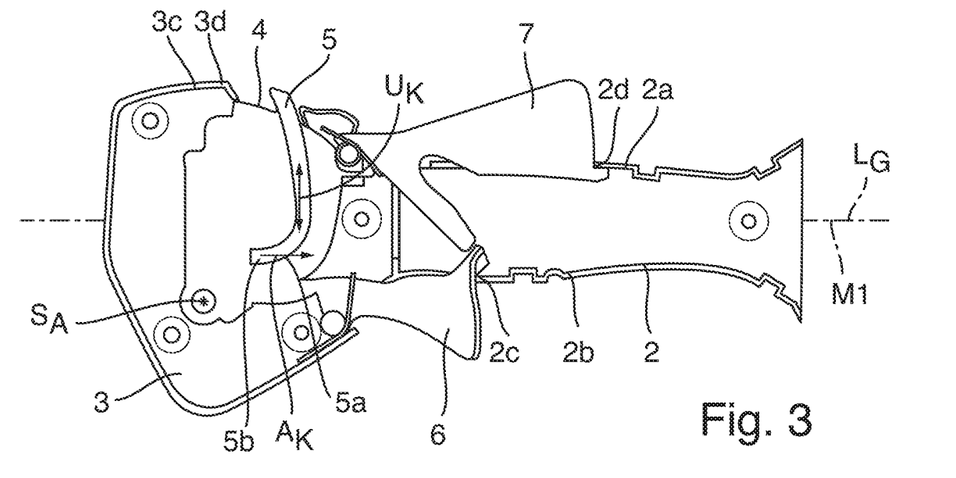
FIG. 3 a side view of the apparatus part shown in FIG. 2 without the housing halves at the front when viewed in the observation direction of FIG. 3.

In advantageous embodiments, the handle shank 2, as in the example shown, comprises an upper palm rest region 2a above a first longitudinal center plane M1, and an underside finger gripping region 2b below the first longitudinal center plane M1, as shown in FIGS. 1 to 3. The finger rest region 5 here extends, on at least one of two mutually opposite sides 3b, 3c of the operating element receiving region 3 relative to a second longitudinal center plane M2 of the handle shank 2, with a bent and/or curved course in circumferential direction and axial direction, as also shown as an example in FIGS. 1 to 3. Here, without restricting the general applicability of orientation definition, a top side in FIGS. 1 to 3 lies above the first longitudinal center plane M1 as a top side, and a lower side in FIGS. 1 to 3 lies below the first longitudinal center plane M1 as an underside. This is based on the fact that in corresponding embodiments, in a typical operating situation, the working apparatus is held by the user such that its top side points vertically upward and accordingly the underside points vertically downward.

In the exemplary embodiment shown, the finger rest region 5 extends on both lateral sides 3b, 3c, in the present case also described as the transverse sides. In alternative embodiments, the finger rest region 5 extends on only one of these two sides 3b, 3c, i.e. in the view of FIG. 1 only on the front or only on the rear side.

In advantageous embodiments, the finger rest region 5, on at least one of the two mutually opposite sides 3b, 3c of the operating element receiving region 3 relative to the second longitudinal center plane M2 of the handle shank 2, in a lower end region, i.e. in an end region pointing towards said underside, has a portion 5a extending upward towards the rear, as also again shown as an example in FIGS. 1 to 3 for an implementation in which this portion 5a, extending upward towards the rear, is provided on both sides 3b, 3c. The term "towards the rear" here means the apparatus direction pointing to the right in FIG. 1, and "forward" means the opposite apparatus direction pointing to the left in FIG. 1. In the present case, the forward direction is also called the distal direction.

Figure 10:
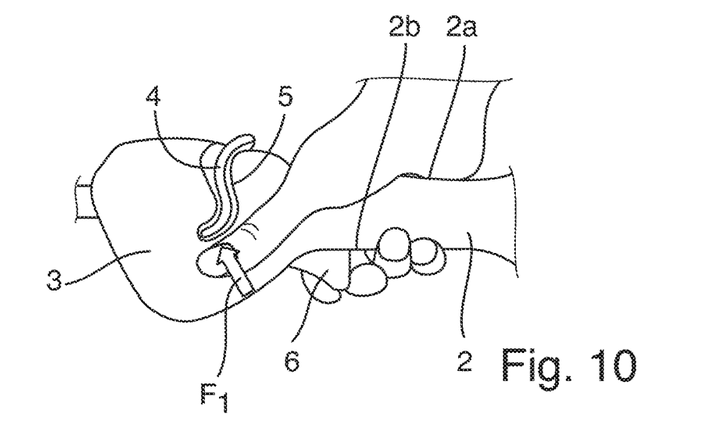
FIG. 10 a perspective side view of an operating device similar to that shown in FIGS. 1 to 9, in a situation with underside thumb control of the pivotable operating lever.

The portion 5a of the finger rest region 5 thus oriented, which accordingly runs with a combination of circumferential direction component $U_K$ and axial direction component $A_K$, consequently constitutes a rest contact face against which the user may press forward and upward, e.g. with the thumb, as depicted in FIG. 10 by a pressure confirmation arrow, as a pressure force $F_1$ for an associated operating situation. FIG. 10 shows in particular a situation in which the user presses, with the thumb tip of the hand gripping the handle shank 2, against this lower portion 5a of the finger rest region 5 of the operating element 4.

In advantageous embodiments, the operating element receiving region 3, as in the example shown, adjoins the handle shank 2 distally, i.e. in a direction pointing to the left in FIG. 1 or towards the front of the working apparatus. In this case, the pivot operating lever 4 may be actuated very comfortably with a distal finger of the user's hand gripping the handle shank, in particular with the thumb and/or index finger of this hand.

In advantageous embodiments, the handle shank 2 has the upper palm rest region 2a above the longitudinal center plane M1 and the underside finger gripping region 2b below the longitudinal center plane M1, and the pivot axis $S_A$ lies below the longitudinal center plane M1. This achieves a favourable pivot movement behaviour and comfortable finger control with little force for the pivot operating lever. In alternative embodiments, the pivot axis $S_A$ is at the height of or above the longitudinal center plane M1.

In advantageous embodiments, the finger rest region 5, as in the example shown, extends arch-shaped continuously between a first end region 5b on a first side 3b of the two mutually opposite sides 3b, 3c of the operating element receiving region 3 relative to the second longitudinal center plane M2 of the handle shank 2, below the first longitudinal center plane M1 of the handle shank 2, and a second end region 5c on the second side 3c of these two sides 3b, 3c below the first longitudinal center plane M1 of the handle shank 2, over a top side region 3d of the operating element receiving region 3 lying above the first longitudinal center plane M1. This implements an extension of the finger rest region 5 over a majority of the periphery of the operating element receiving region 3, so that the user may, for operation, flexibly and variably contact the pivot operating lever 4 with a suitable finger at a respective appropriate point along the longitudinal extension of the finger rest region 5.

In alternative embodiments, the finger rest region 5 extends only on the one transverse side 3b or only on the other transverse side 3c, or only in the top side region 3d of the operating element receiving region 3, or as a further alternative only on two of these three sides 3b, 3c, 3d, or in further alternative embodiments in the bottom region of the operating element receiving region 3 and optionally on one of the three other sides 3b, 3c, 3d.

In advantageous embodiments, the operating unit of the operating device acting on the operation of the working apparatus comprises, as further operating elements, a power operating element 6 extending in an bottom region 2c of the handle shank 2, and a safety operating element 7 extending in the top side region 2d of the handle shank 2. The power operating element 6 and the safety operating element 7 are held movably, e.g. pivotably or alternatively displaceably, on the operating element receiving region 3. The pivot operating lever 4 is in this case configured as a blocking lever which in a blocking position blocks a movement of the power operating element 6 and/or of the safety operating element 7, and in a release position allows the movement of the power control operating element 6 and/or of the safety operating element 7. This advantageous operating configuration with said three operating elements is particularly suitable for associated types of working apparatuses, as known in themselves in the prior art and therefore not requiring further description, e.g. for hedge trimmers, pruners, strimmers and other such gardening and/or forestry apparatuses. The power control operating element may for example be an on/off switch element for a battery-powered electric working apparatus, or a throttle lever for a working apparatus with internal combustion engine. The safety operating element 7 may for example have the function of blocking actuation of the power control operating element 6 in a blocking position and releasing this in a release position, and in this way secure the power control operating element 6 against accidental actuation.

The blocking and release of the power control operating element 6 and/or safety operating element 7 by the pivot operating lever 4 may for example be implemented mechanically, as in the exemplary embodiment shown; any blocking and release of the power control operating element 6 by the safety operating element 7 may take place similarly.

Figure 5:
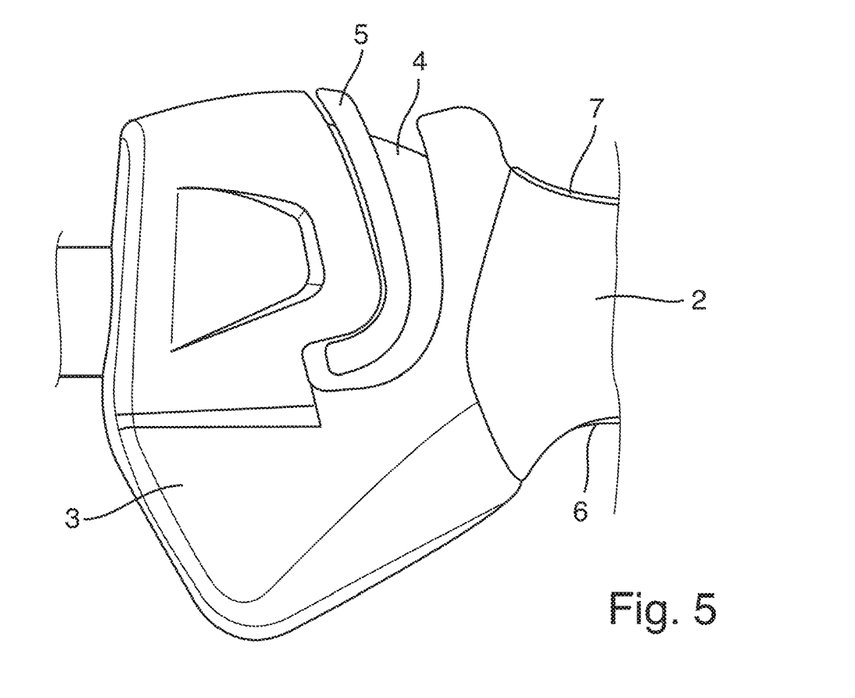
FIG. 5 the view from FIG. 4 with pivoted pivot operating lever.
Figure 6:
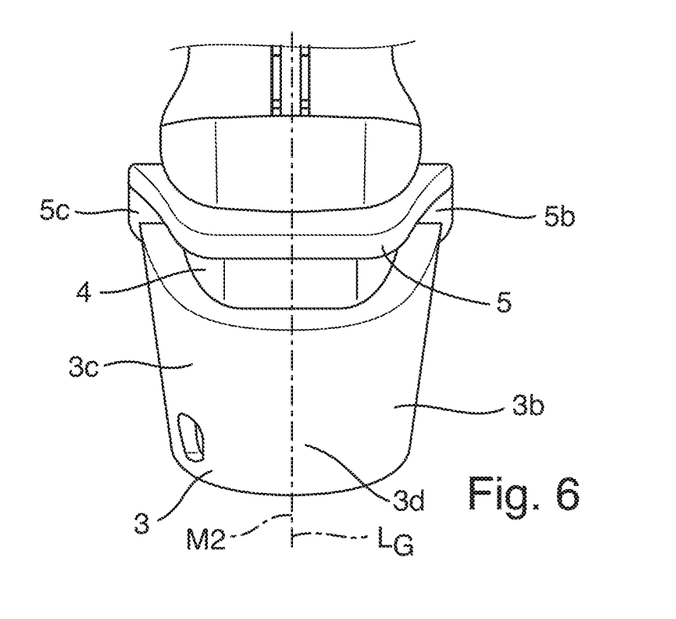
FIG. 6 a top view corresponding to the side view of FIG. 4.
Figure 7:
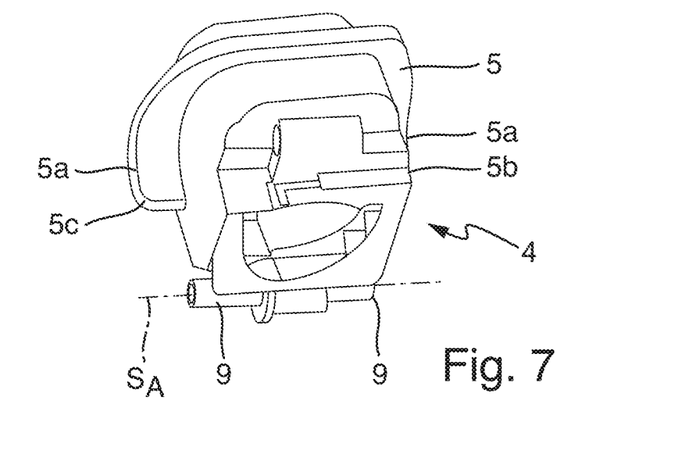
FIG. 7 a perspective view of the pivot operating lever which can be actuated by a finger.
Figure 8:
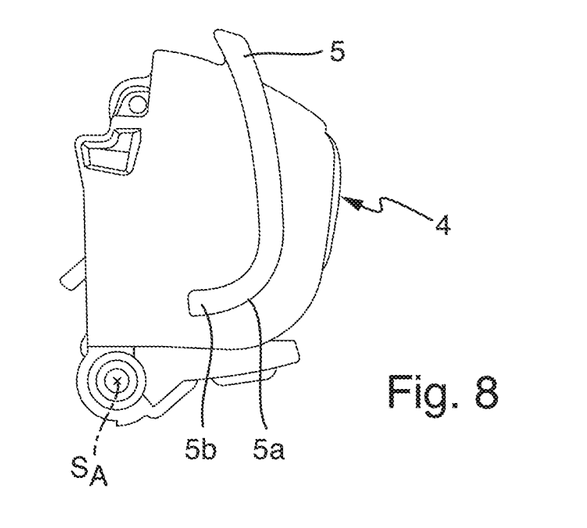
FIG. 8 a side view of the operating device.
Figure 11:
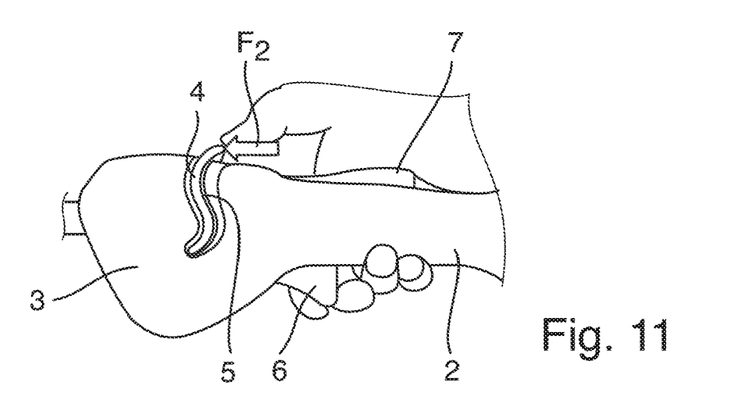
FIG. 11 the view from FIG. 10 in a situation with top thumb control of the operating element.
Figure 12:
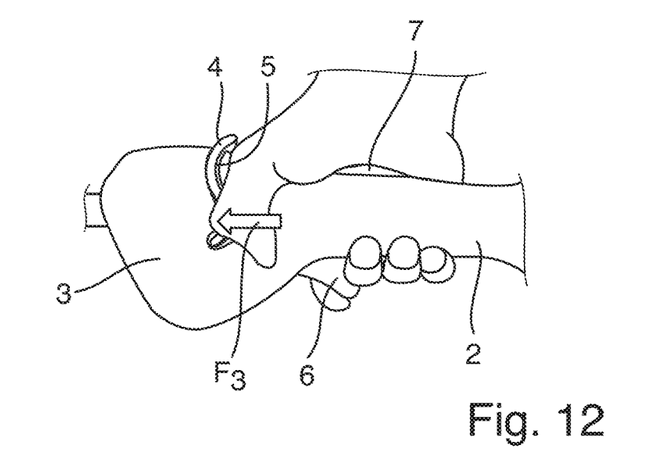
FIG. 12 the view from FIG. 10 with side thumb control of the operating element.

In a typical implementation, the safety operating element 7 only allows actuation of the power control operating element 6 when it is pressed, from the starting situation shown in FIG. 1, into the handle shank 2 by the palm of the hand gripping the handle shank 2, as shown in the operating situations of FIGS. 10 to 12; and the pivot operating lever 4, acting as a blocking lever, only releases the safety operating element 7 and/or the power control operating element 6 when, starting from the starting position shown in FIGS. 1 to 4, the user has pivoted it into a release position according to FIG. 5. Only after such release of the movement of the power control operating element 6 may the latter be actuated according to its function, preferably by one or more fingers of the hand gripping the handle shank 2.

If the pivot operating lever 4 with its finger rest region 5 extends exclusively or at least also in the top side region 3d of the operating element receiving region 3, the user may there actuate the pivot operating lever 4, for example in the manner illustrated in FIG. 11, in pivoting fashion by pressing against the finger rest region 5 with a pressure force $F_2$ directed substantially distally forward.

The bent and/or angled course of the finger rest region 5 with circumferential direction component $U_K$ and axial direction component $A_K$, on at least one of the two transverse sides 3b, 3c of the operating element receiving region 3, also for example allows actuation of the pivot operating lever 4 with the front thumb joint as illustrated in FIG. 12. Here, the user presses with this region of the thumb, exerting a pressure force $F_3$ directed substantially distally forward, against the finger rest region 5 in its portion there.

Depending on the actual embodiment of the bent and/or angled course of the finger rest region 5, instead of or in addition to the actuation variants illustrated in FIGS. 10 to 12, other and/or further actuation variants for finger control of the pivot operating lever 4 are possible. For example, the user may also actuate the pivot operating lever 4 by pivoting with the index finger, if the finger rest region 5 is situated exclusively or in any case also in the region distally in front of the position at which the index finger lies when the user correctly grips or surrounds the handle shank 2 with his hand.

The embodiment variant shown in FIGS. 10 to 12 corresponds to that of FIGS. 1 to 9 with the only exception that the bent and/or angled course of the finger rest region 5 of the pivot operating lever 4 is slightly modified. Whereas, in the exemplary embodiment of FIGS. 1 to 9, the finger rest region 5 extends from a lower end region 5b initially axially forward then in an arc upward and slightly forward up to the top side, and from there runs mirror-symmetrically to the second end region 5c, in the embodiment variant of FIGS. 10 to 12 it runs from the respective lower end region 5b, 5c with an S-shaped course to the top side region 3d.

Figure 9:
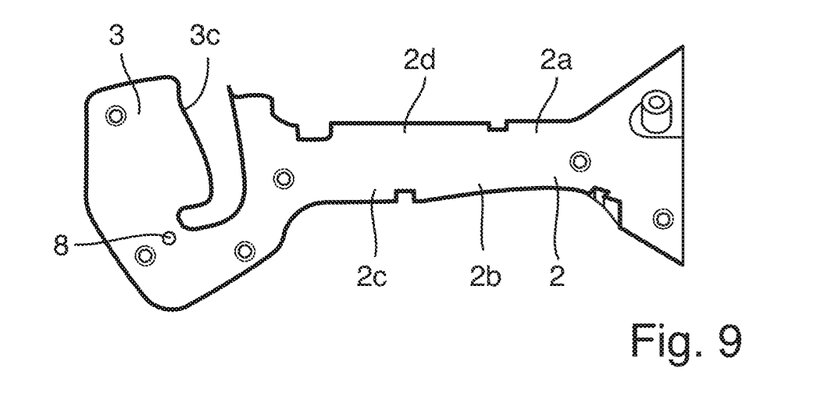
FIG. 9 the view from FIG. 3 without the operating elements.

In all cases, the user presses against the finger rest region 5 with sufficient distance from the touch contact point to the pivot axis $S_A$, whereby the respective actuation pressure force $F_1$, $F_2$, $F_3$ generates a corresponding torque $D_S$, indicated in FIG. 4, for pivoting the pivot operating lever 4 about the pivot axis $S_A$. For this, the position and shape of the finger rest region 5 are suitably matched to the position of the pivot axis $S_A$. In the example shown, the pivot axis $S_A$ is defined in that the pivot operating lever 4 is mounted pivotably on both transverse sides by an axle pin 9 in a respective axle pin receiver 8 on an inside of two half-shell bodies, which together form an outer housing of the handle shank 2 and the operating element receiving region 3, wherein FIG. 9 shows a side view of the inside of one of the two half-shell bodies.

As the exemplary embodiments shown and those explained above clearly indicate, the invention provides an operating device with an operating unit acting on the apparatus operation, which has a pivot operating lever that can be actuated by the user with a finger of a hand gripping a handle shank of the operating device, which allows single-handed operation with one hand that, if necessary, at the same time is also used to hold or carry or guide the working apparatus, wherein the pivot operating lever has a finger rest region with characteristic curved and/or angled course which allows the user comfortable, ergonomic and/or variable finger control of the pivot operating lever.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An operating device for a hand-guided motorized working apparatus, comprising:
   a handle with a handle shank configured to be hand-gripped;
   an operating element receiving region adjoining the handle shank along a longitudinal axis of the handle shank; and
   an operating unit which acts on the apparatus operation and comprises an operating element which is a pivot operating lever held pivotably about a pivot axis on the operating element receiving region and is configured for actuation by a finger which extends beyond the hand grip from a hand gripping the handle shank, and comprises a finger rest region formed on an outer surface of the pivot operating lever,
   wherein
   the pivot axis extends with a main direction component perpendicular to the shank longitudinal axis of the handle shank,
   the pivot operating lever and the finger rest region both have a longitudinal extension along an outer side of the operating element receiving region, said longitudinal extension of the pivot operating lever and the finger rest region extending with a circumferential direction component orthogonal to the longitudinal axis of the handle shank and an axial direction component parallel to the longitudinal axis of the handle shank along at least one of a bent and an angled course in the circumferential direction following a corresponding contour of said outer side of the operating element receiving region, and
   the finger rest region extends arch-shaped continuously between a first end region on a first of two mutually opposite sides of the operating element receiving region and a second end region on the second of the two mutually opposite sides of the operating element receiving region over a top side region of the operating element receiving region, the top side region lying above a first longitudinal center plane of the handle shank.

2. The operating device according to claim 1, wherein the handle shank comprises an upper palm rest region above the first longitudinal center plane, and a lower finger gripping region below the first longitudinal center plane, and the finger rest region extends, at least on one of the two mutually opposite sides of the operating element receiving region relative to a second longitudinal center plane of the handle shank perpendicular to the first longitudinal center plane, with at least one of a bent and an angled course in the circumferential direction and the axial direction.

3. The operating device according to claim 2, wherein the finger rest region, on the at least one of the two mutually opposite sides of the operating element receiving region relative to the second longitudinal center plane of the handle shank, in a lower end region, has a portion extending upward towards the rear.

4. The operating device according to claim 1, wherein the handle shank comprises an upper palm rest region above the first longitudinal center plane, and a lower finger gripping region below the first longitudinal center plane, and the pivot axis lies below the first longitudinal center plane.

5. The operating device according to claim 2, wherein the first end region is on the first of the two mutually opposite sides of the operating element receiving region relative to the second longitudinal center plane of the handle shank, below the first longitudinal center plane of the handle shank, and the second end region is on the second of the two mutually opposite sides of the operating element receiving region relative to the second longitudinal center plane of the handle shank.

6. The operating device according to claim 1, further wherein
the operating unit, as further operating elements, comprises a power control operating element extending in a bottom region of the handle shank, and a safety operating element extending in a top side region of the handle shank, both being held movably on the operating element receiving region, and
the pivot operating lever is configured as a blocking lever which in a blocking position blocks a movement of the power control operating element and at least one of the safety operating element, and in a release position allows the movement of at least one of the power control operating element and the safety operating element.

7. The operating device according to claim 1, wherein the longitudinal extension has a greater length in the circumferential direction than in the axial direction.

8. The operating device according to claim 7, wherein the handle shank comprises an upper palm rest region above the first longitudinal center plane, and a lower finger gripping region below the first longitudinal center plane, and the finger rest region extends, at least on one of the two mutually opposite sides of the operating element receiving region relative to a second longitudinal center plane of the handle shank perpendicular to the first longitudinal center plane, with at least one of a bent and an angled course in the circumferential direction and the axial direction.

9. The operating device according to claim 8, wherein the finger rest region, on the at least one of the two mutually opposite sides of the operating element receiving region relative to the second longitudinal center plane of the handle shank, in a lower end region, has a portion extending upward towards the rear.

10. The operating device according to claim 7, wherein the handle shank comprises an upper palm rest region above the first longitudinal center plane, and a lower finger gripping region below the first longitudinal center plane, and the pivot axis lies below the first longitudinal center plane.

11. The operating device according to claim 10, wherein the first end region is on the first of the two mutually opposite sides of the operating element receiving region relative to the second longitudinal center plane of the handle shank, below the first longitudinal center plane of the handle shank, and
the second end region is on the second of the two mutually opposite sides of the operating element receiving region relative to the second longitudinal center plane of the handle shank.

12. The operating device according to claim 7, further wherein
the operating unit, as further operating elements, comprises a power control operating element extending in a bottom region of the handle shank, and a safety operating element extending in a top side region of the handle shank, both being held movably on the operating element receiving region, and
the pivot operating lever is configured as a blocking lever which in a blocking position blocks a movement of the power control operating element and at least one of the safety operating element, and in a release position allows the movement of at least one of the power control operating element and the safety operating element.

13. A hand-guided motorized working apparatus comprising an operating device, said operating device comprising:
a handle with a handle shank configured to be hand-gripped;
an operating element receiving region adjoining the handle shank along a longitudinal axis of the handle shank; and
an operating unit which acts on the apparatus operation and comprises an operating element which is a pivot operating lever held pivotably about a pivot axis on the operating element receiving region and is configured for actuation by a finger which extends beyond the hand grip from a hand gripping the handle shank, and comprises a finger rest region formed on an outer surface of the pivot operating lever,
wherein
the pivot axis extends with a main direction component perpendicular to the a shank longitudinal axis of the handle shank,
the pivot operating lever and the finger rest region both have a longitudinal extension along an outer side of the operating element receiving region, said longitudinal extension of the pivot operating lever and the finger rest region extending with a circumferential direction component orthogonal to the longitudinal axis of the handle shank and an axial direction component parallel to the longitudinal axis of the handle shank along at least one of a bent and an angled course in the circumferential direction following a corresponding contour of said outer side of the operating element receiving region, and
the finger rest region extends arch-shaped continuously between a first end region on a first of two mutually opposite sides of the operating element receiving region and a second end region on the second of the two mutually opposite sides of the operating element receiving region over a top side region of the operating element receiving region, the top side region lying above a first longitudinal center plane of the handle shank.

14. The hand-guided motorized working apparatus according to claim 13, wherein the apparatus is a hand-guided motorized gardening/forestry apparatus.

* * * * *